United States Patent [19]
Adam et al.

[11] Patent Number: 5,637,226
[45] Date of Patent: Jun. 10, 1997

[54] MAGNETIC FLUID TREATMENT

[75] Inventors: LaVern L. Adam; Harley J. Adam; Jimmy D. Adam, all of Cherokee Village; Mark A. Miller, Agnos, all of Ark.

[73] Assignee: AZ Industries, Incorporated, Hardy, Ak.

[21] Appl. No.: 516,755

[22] Filed: Aug. 18, 1995

[51] Int. Cl.[6] ........................................... B01D 35/06
[52] U.S. Cl. ..................... 210/695; 210/222; 123/536; 95/28; 96/1
[58] Field of Search ........................ 210/222, 223, 210/695; 123/536, 538; 95/28; 96/1

[56] References Cited

U.S. PATENT DOCUMENTS

| | | |
|---|---|---|
| 2,653,925 | 9/1953 | Vermeiren . |
| 3,091,229 | 5/1963 | Nevin . |
| 3,228,878 | 1/1966 | Moody . |
| 3,349,354 | 10/1967 | Miyata . |
| 3,989,017 | 11/1976 | Reece . |
| 4,157,963 | 6/1979 | Jessop et al. . |
| 4,210,535 | 7/1980 | Risk . |
| 4,265,754 | 5/1981 | Menold . |
| 4,265,755 | 5/1981 | Zimmerman . |
| 4,308,847 | 1/1982 | Ruizzo, Jr. . |
| 4,343,707 | 8/1982 | Lucas . |
| 4,367,143 | 1/1983 | Carpenter . |
| 4,372,852 | 2/1983 | Kovacs . |
| 4,461,262 | 7/1984 | Chow . |
| 4,519,919 | 5/1985 | Whyte et al. . |
| 4,568,901 | 2/1986 | Adam . |
| 4,605,498 | 8/1986 | Kulish . |
| 4,611,615 | 9/1986 | Petrovic . |
| 4,659,479 | 4/1987 | Stickler et al. . |
| 4,711,271 | 12/1987 | Weisenbarger et al. . |
| 4,746,425 | 5/1988 | Stickler et al. . |
| 4,772,387 | 9/1988 | Simoni . |
| 4,935,133 | 6/1990 | Hirama . |
| 5,055,188 | 10/1991 | Johnston et al. . |
| 5,070,852 | 12/1991 | Po et al. . |
| 5,076,246 | 12/1991 | Onyszezuk . |
| 5,161,512 | 11/1992 | Adam et al. . |
| 5,171,487 | 12/1992 | Hudz . |
| 5,176,203 | 1/1993 | Larzul . |
| 5,320,751 | 6/1994 | Burns . |

FOREIGN PATENT DOCUMENTS

| | | | |
|---|---|---|---|
| 0073077 | 3/1983 | European Pat. Off. . | |
| 59-93954 | 5/1984 | Japan . | |
| 66215 | 3/1994 | Japan | 123/536 |
| 264835 | 9/1994 | Japan | 123/536 |
| 899490 | 1/1982 | U.S.S.R. | 210/222 |
| 163965 | 1/1991 | U.S.S.R. | 210/222 |

*Primary Examiner*—Matthew O. Savage
*Attorney, Agent, or Firm*—Eugene Stephens & Associates

[57] ABSTRACT

A fluid is circulated through a region of single magnetic polarity within a complex magnetic field and with increased exposure time as compared to prior art devices. The fluid travels through a coil of tubing arranged between two magnetic fields that interact to form the region of single polarity. In a preferred embodiment, the fields are generated by two sets of magnets, one on the inside of the coil and one on the outside of the coil. The magnets are arranged such that like poles of all the magnets face the tubing in the coil, creating the region of single polarity. Treating fuel or recirculated exhaust gases prior to burning in internal combustion engines results in improved engine output characteristics.

21 Claims, 7 Drawing Sheets

MAGNETIC FLUID TREATMENT

FIELD OF THE INVENTION

Our invention relates to the treatment of fluids by exposure to magnetic fields. In particular, our invention relates to the treatment of fuels and recirculated exhaust gases burned in internal combustion engines.

BACKGROUND OF THE INVENTION

For some time it has been observed that improvements in internal combustion engine output characteristics result when fuel is exposed to a magnetic field prior to combustion. In fact, the effects of magnetic fields on a variety of fluids have been observed, resulting in the development of devices to treat everything from fuel to exhaust gases to water and other fluids in a wide range of applications.

For example, U.S. Pat. No. 4,343,707 to Lucas discloses a magnetic water treating device that provides for inhibiting formation of scale and growth of algae, for eliminating taste and odor from water and for providing corrosion protection. Water is circulated through a helical conduit having magnets arranged along the outside of the path. Alternating poles of the magnets face the water along the flow path such that the combined magnetic and centrifugal forces urge particles in the water toward the outer periphery of the conduit. The water is divided into two streams at the outlet of the conduit, the outer stream containing the contaminants and the inner stream containing purified water.

Another example of a magnetic conditioning device is that disclosed by U.S. Pat. No. 4,772,387 to Simoni. This device also uses a helical flow path. Instead of using a baffle, however, Simoni uses lateral openings at opposite ends of the conditioner to induce helical flow.

We have found that the effects of magnetic fluid treatment are enhanced by passing the fluid through a single-polarity, constant strength region of a magnetic field. We have particularly observed that treating fuel or exhaust gases in this manner improves engine output characteristics. While some devices, including our own, do this to some degree, none have done it to the degree possible. Consequently, there is room for even further improvements, such as providing a device that exposes fluid to a constant, relatively strong magnetic field for a significant amount of time prior to combustion.

One example of this type of fluid treatment is U.S. Pat. No. 4,568,901 to one of the inventors of the instant invention. It discloses a magnetic treatment device that provides for focusing magnetic field energy within a conduit. Permanent magnets are encapsulated in polyethylene and are arranged with like magnetic poles facing the conduit. The resulting field boundaries are concentrated within the conduit for exposing fluid flowing through the conduit to a greater amount of magnetic field energy. The device is particularly suitable for enhancing fuel combustion.

Another magnetic fluid conditioner using a region of single magnetic polarity is disclosed in U.S. Pat. No. 5,161,512 to two inventors of the instant invention. This device represents an improvement over the previous patent in that the orientations of the magnetic field lines and the magnets themselves are varied over the length of the conduit while simultaneously circulating the fluid in a helical path through the conduit. The conditioner is particularly suitable for the treatment of fuels and recirculated exhaust gases.

U.S. Pat. No. 5,171,487 to Hudz is an example of a recent magnetic fuel treatment device. This device sends fuel through a coiled fuel line 10a to a vaporization chamber. Electric current is run through the fuel line to cause the line to act as a resistance heating element as well as a solenoid coil. As a result, the fuel in the line is heated and vaporized as it travels through the fuel line. A magnetic field is also established around the fuel line in the shape typical of solenoid-generated fields. The field is oriented such that it is strongest near the outlet 30 of the fuel line in the vaporization chamber and is of substantially one polarity in that region. However, the exposure time is relatively brief and the field strength varies within the chamber. The addition of a ring magnet 28 over the coil 10a exposes the fuel to a single-polarity magnetic field while it is in the coil, but the field generated by the ring magnet is relatively weak and decreases in strength as the fuel moves down the coil.

SUMMARY OF THE INVENTION

We have discovered that the effects of magnetic fluid treatment are enhanced with increased exposure time. Our invention goes beyond what has been done previously to provide an even better fluid conditioner using a unique arrangement of magnets about a flow path. The arrangement is believed to expose the fluid to even more constant and intense amounts of magnetic field energy than prior art devices. Also, because of the unique arrangement of the flow path and magnets, the duration of exposure of the fluid to the magnetic field is greatly increased.

Fluid is sent through a coil of tubing arranged between two essentially annular magnetic fields with like poles facing the coil. One way of generating the fields is to arrange magnets on the inside and outside of the coil. The fields interact such that a fairly constant single polarity magnetic field of relatively high intensity is present in the tubing over its whole length in the coil. As a result of the coiled form of the tubing, the flow path of the fluid through the magnetic field is greatly increased, thus increasing the duration of exposure to the magnetic field. In the case of fuel and recirculated exhaust gas treatment, significant improvements in the output characteristics of engines result.

DETAILED DESCRIPTION OF THE INVENTION

With particular reference to the accompanying Figures, an exemplary embodiment of the magnetic fluid treatment device 1 includes a coil 2 of tubing 11 that has an inlet 3 and an outlet 4. The coil 2 can have any suitable shape, including that of a helix, and can be of any suitable cross section. The tubing 11 is preferably made of a material that is non-magnetic and substantially transparent to magnetic fields. Two magnets 5, 6 or other sources of magnetic fields are placed adjacent inner and outer peripheries of the coil, respectively. The sources are oriented such that one pole of each source faces the tubing 11, the poles being of like polarity.

While any appropriate sources of magnetic fields could be used, the invention preferably uses permanent magnets. The permanent magnets could take any suitable form, such as annular magnets in the preferred embodiment, however, the invention uses a plurality of bar magnets 7, 8. While magnets 8 are shown in the Figures as having rectangular cross sections, it should be clear that magnets of any cross section and shape can be used, including bar magnets of square or arcuate cross section. Though either polarity can be used to permeate the coil 2, we have observed better performance using South polarity. The actual number of magnets 7, 8 used will depend on the field strength desired in the tubing as well as the dimensions of the magnets 7, 8 and the coil 2 and tubing 11.

Figures 1, 2:
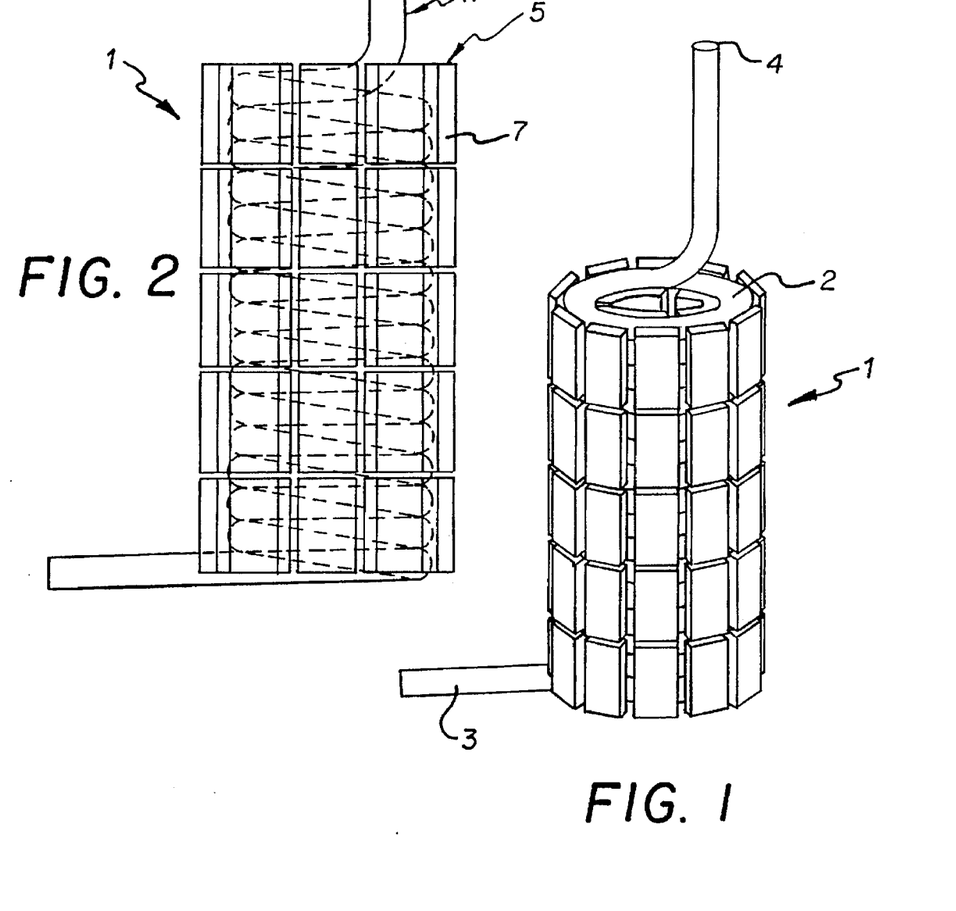
FIG. 1 is an perspective view of the coil and magnets of the instant invention.
FIG. 2 is a side schematic view of the coil and magnets of the invention.
Figure 3:
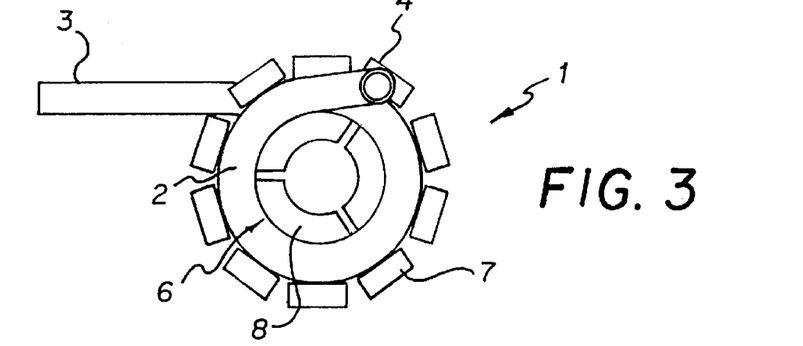
FIG. 3 is an end schematic view of the coil and magnets of the invention.
Figure 4:
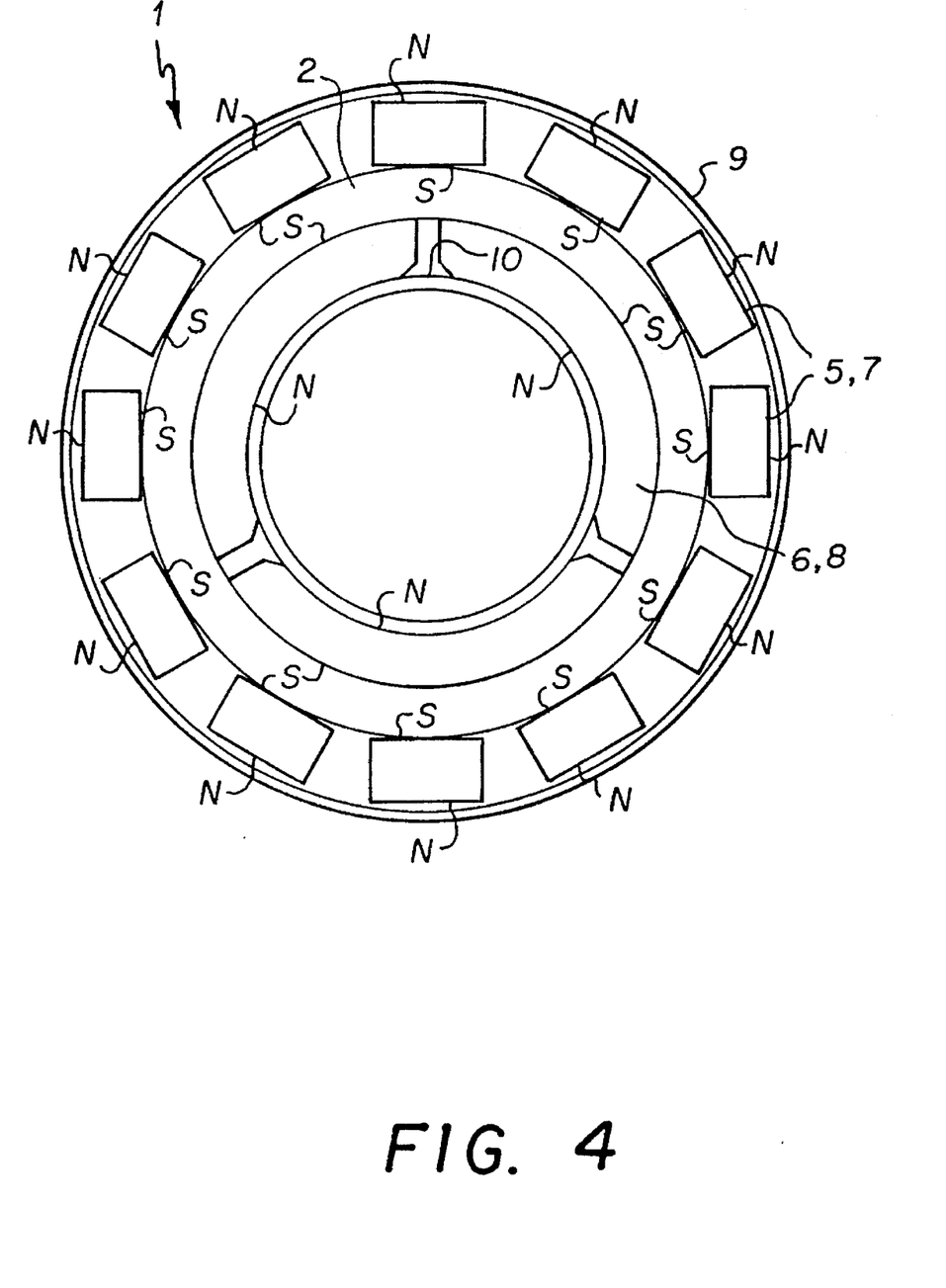
FIG. 4 is an end view of the invention.
Figure 5:
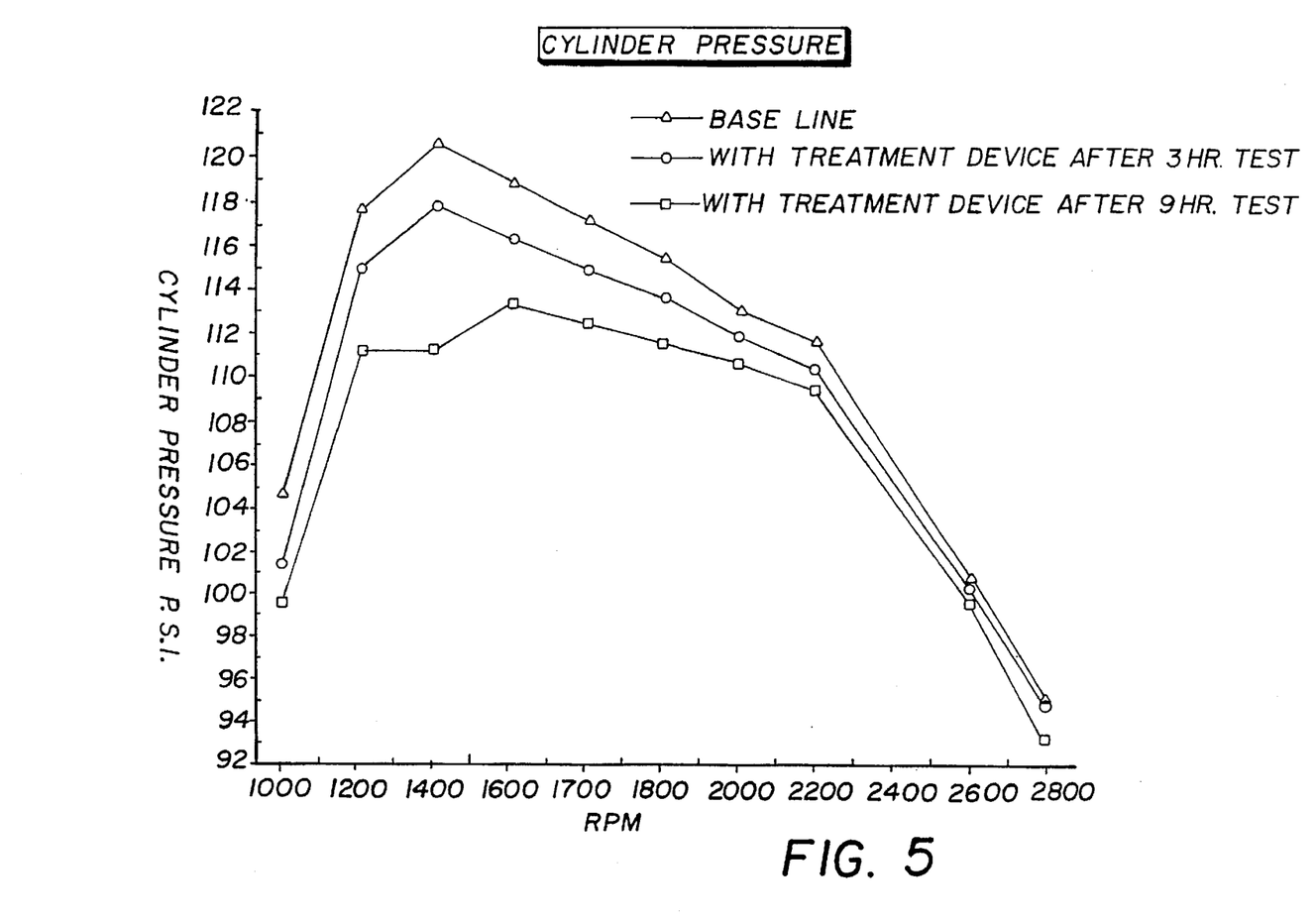
FIG. 5 is a graph of cylinder pressure vs. engine speed for an internal combustion (IC) engine with and without the use of our invention.

FIG. 4 is illustrative of the arrangement of the magnets 7, 8 according to the preferred embodiment of the invention. As shown, the outer magnets 7 are arranged such that like poles face the tubing 11. In this case, the South poles of the outer magnets 7 face the tubing 11. The inner magnets 8 are also arranged so that like poles face the coil 2 and so that the poles facing coil 2 are of the same polarity as the facing poles of the outer magnets 7. This arrangement forms a nearly constant magnetic field within the tubing 11 that is substantially of one magnetic polarity. In this case, the field is of South polarity.

In the preferred embodiment, the coil 2 and the magnets 5, 6, 7, 8 are contained in an outer housing 9 to protect the assembly and contain the parts. The inner magnets 6, 8 are also preferably held in place by an interior spacer 10.

In operation, fluid, such as fuel or recirculated exhaust gases, is sent through the coil 2 via inlet 3. As the fluid progresses through the coil 2, it is exposed to the magnetic field formed by the magnets 7, 8. As a result of the use of the coil 2, the fluid remains within the magnetic field for a much longer period of time than it would in prior devices. The fluid then exits through outlet 4 and is passed on, in the case of an internal combustion (IC) engine, to the combustion chamber where it is burned.

The magnets 5, 6, 7, 8 form essentially annular magnetic fields. A first annular magnetic field is generated by the outer magnets 5, 7 such that one pole of the field is oriented towards the center or central axis of the annular field. A second annular field is generated by the inner magnets 6, 8 coaxially within the first annular field and with its poles oriented such that the second annular field's outer pole is of the same polarity as the first annular field's inner pole. This means that like poles of the two annular fields face each other, creating the annular region of substantially one magnetic polarity. This single-polarity region is juxtaposed or superimposed with the coil 2. These fields interact in the space occupied by the tubing 11 to create a complex magnetic field with an annular region of substantially one magnetic polarity sandwiched between two annular regions of opposite magnetic polarity. In other words, if bar magnets are used and are oriented with their South poles facing the tubing 11, an annular region of South magnetic polarity will permeate the tubing 11, an annular region of North polarity will surround the device, and an annular region of North polarity will form within the inner periphery of the inner magnets. The resulting field is substantially constant and relatively strong through the whole length of the tubing 11.

Figure 6:
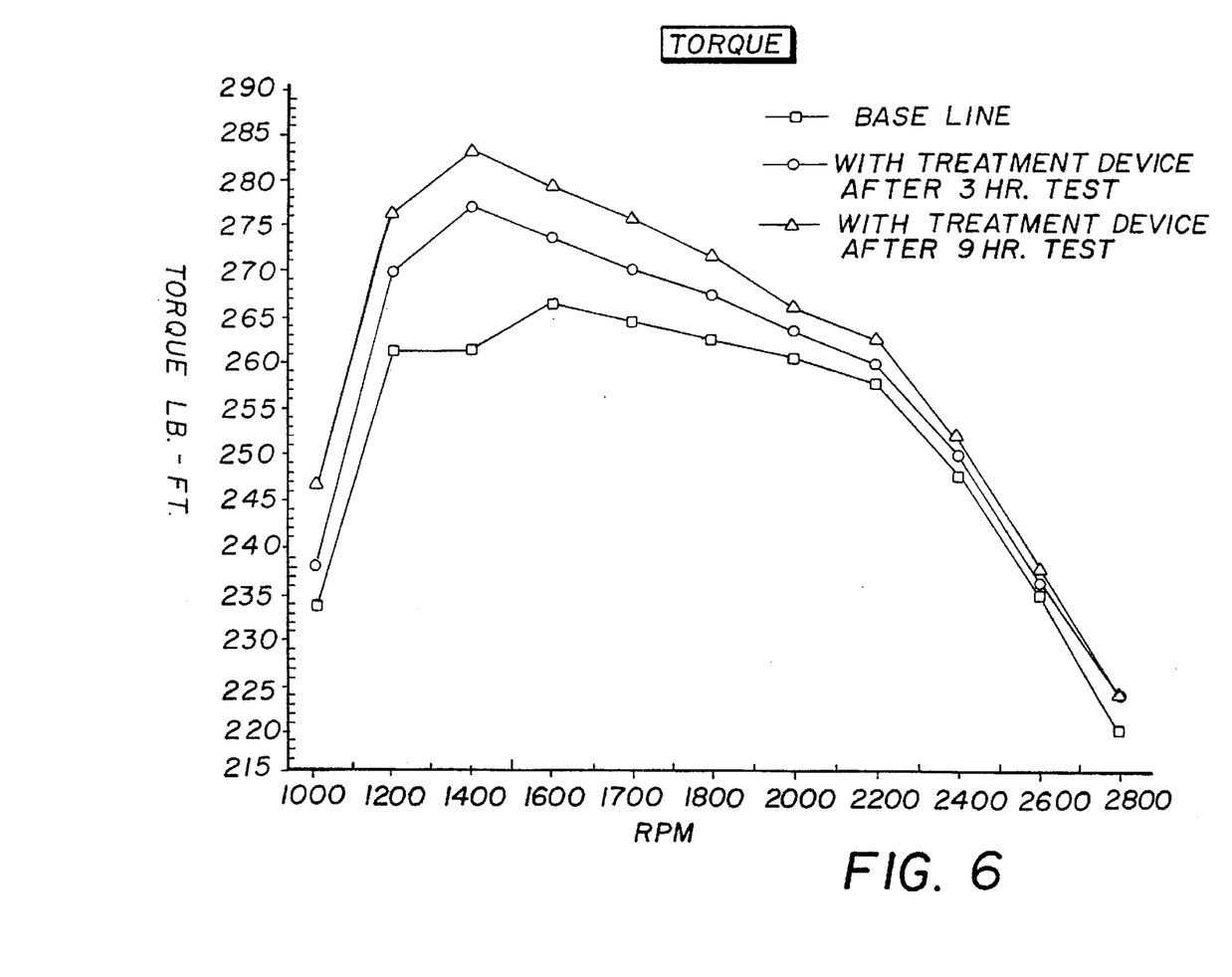
FIG. 6 is a graph of torque vs. engine speed for an IC engine with and without the use of our invention.
Figure 7:
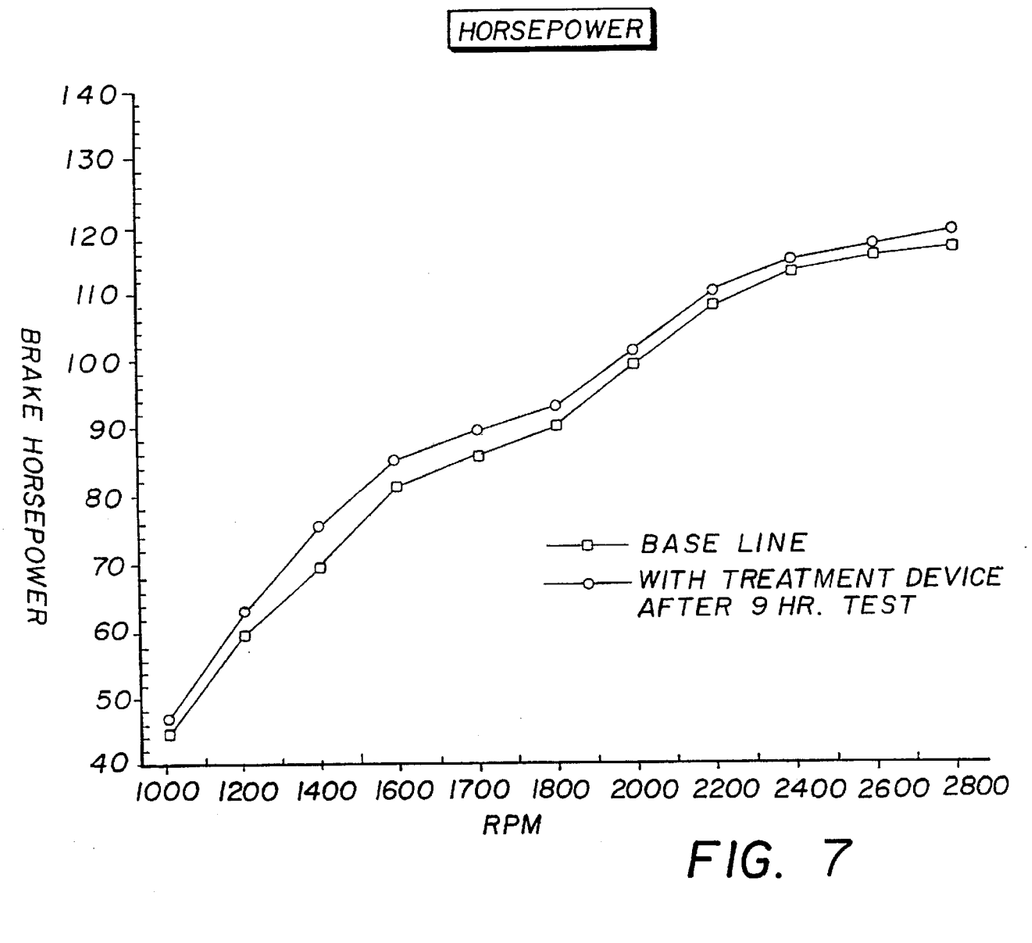
FIG. 7 is a graph of power vs. engine speed for an IC engine with and without the use of our invention.
Figure 8:
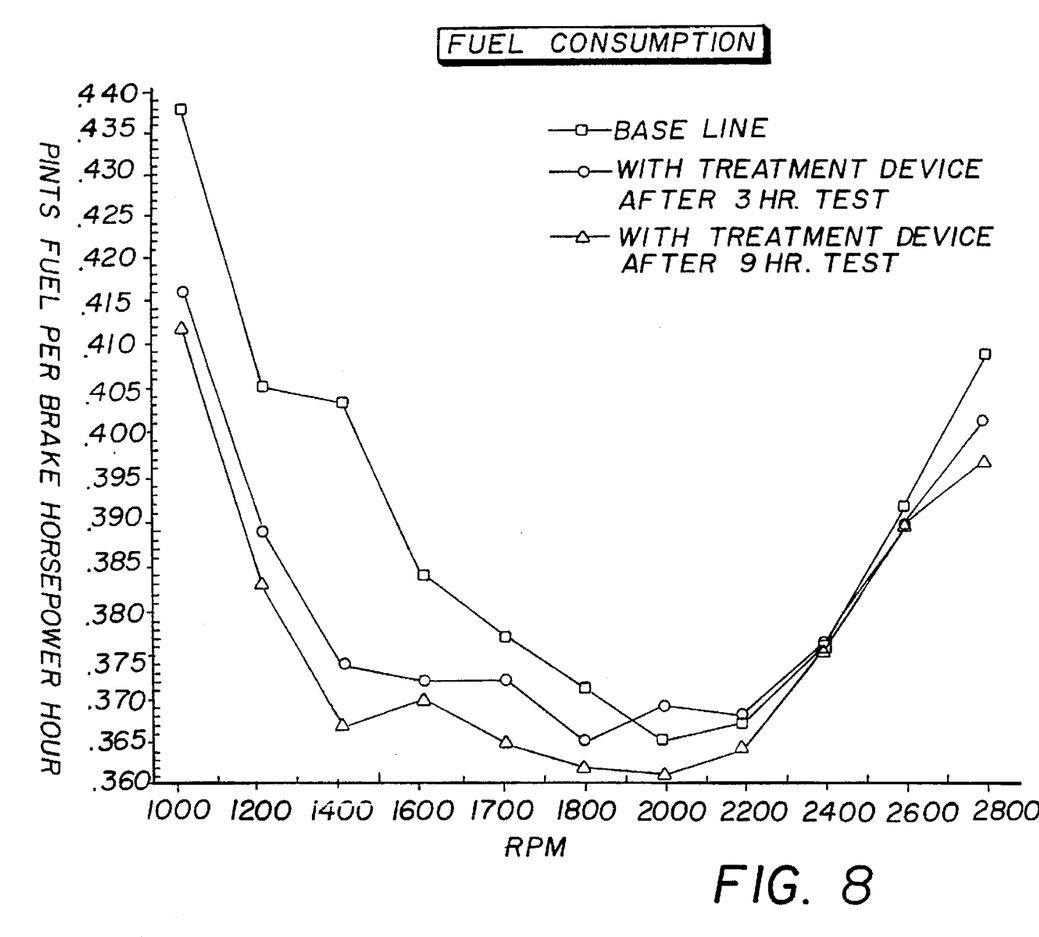
FIG. 8 is a graph of fuel consumption vs. engine speed for an IC engine with and without the use of our invention.
Figure 9:
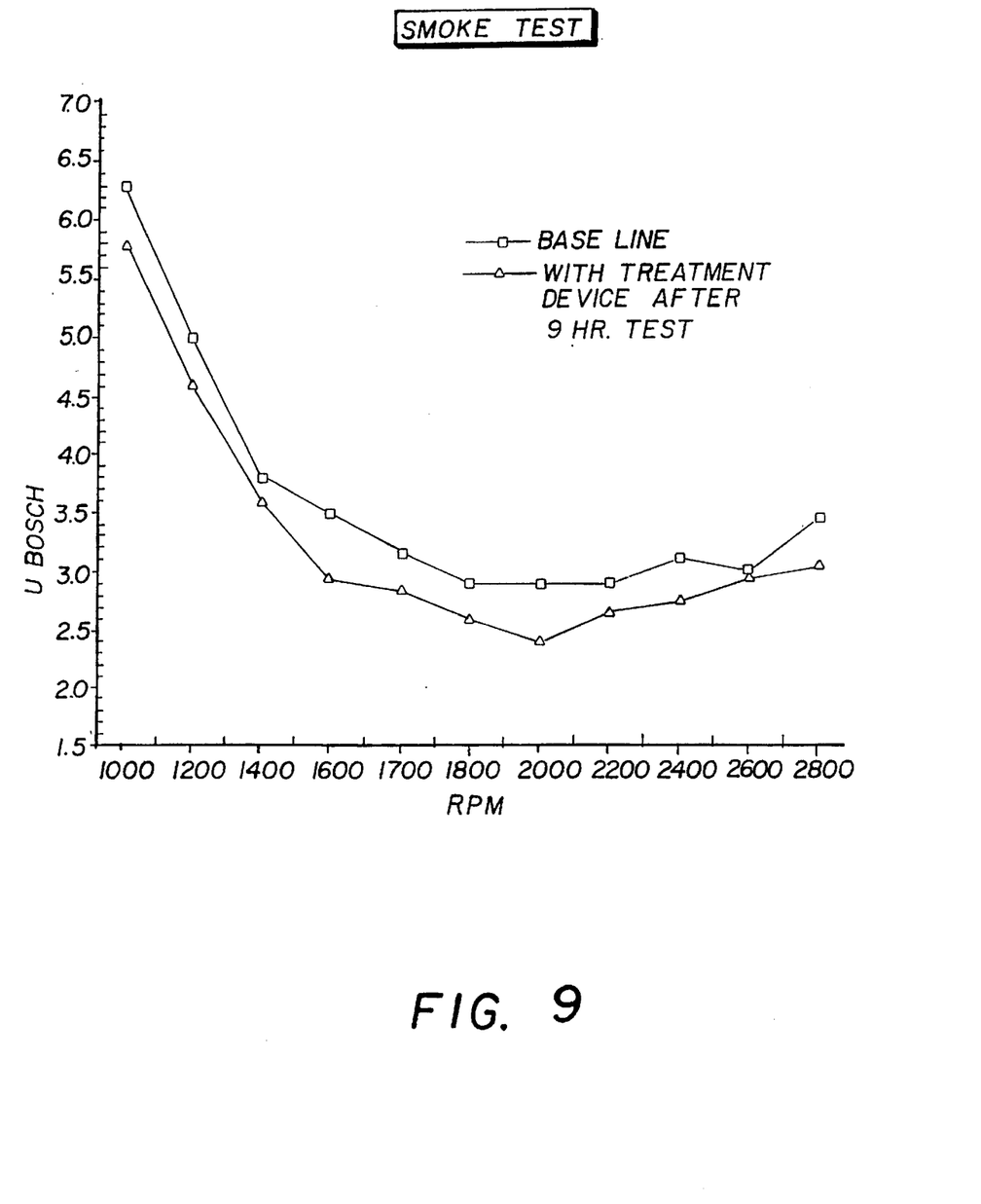
FIG. 9 is a graph of emissions vs. engine speed for an IC engine with and without the use of our invention.

FIGS. 5–9 are graphs illustrating the results of tests performed to confirm the effect of the invention. The tests compared various output characteristics of an IC engine burning treated fuel to those of an IC engine burning untreated fuel. The tests also compared IC engine performance when burning untreated exhaust gases to IC engine performance when burning treated exhaust gases. Apparently as a result of exposure to the magnetic field, fuel or exhaust gases passed through the device burn better and more completely, resulting in improved engine output characteristics. For example, FIG. 5 clearly indicates an increase in the cylinder pressure of the engine over the range of engine speed tested. Similar results are apparent in output torque and output power as shown in FIGS. 6 and 7. Likewise, decreases in fuel consumption and emissions are evident from the graphs of FIGS. 8 and 9, indicating significant improvement in both fuel efficiency and emissions using the device when compared to the use of untreated fuel. With such dramatic changes in the output characteristics, it is clear that use of this invention can result in fuel savings, better engine performance, and a cleaner environment.

We claim:

1. A magnetic fluid treatment device comprising:

a. a tube formed in the shape of a coil, the coil having an inner periphery and an outer periphery, the inner and outer peripheries being substantially coaxial with a longitudinal axis of the coil, the inner periphery being closer to the longitudinal axis than the outer periphery, and the tube having an inlet and an outlet through which fluid can flow;

b. a first magnetic field source adjacent the outer periphery of the coil and arranged such that one pole of a first magnetic field faces and permeates the tube and such that the one pole of the first magnetic field faces the outer periphery of the coil; and c. a second magnetic field source adjacent the inner periphery of the coil and oriented such that one pole of a second magnetic field faces and permeates the tube and such that the one pole of the second magnetic field faces the inner periphery of the coil, the pole of the first magnetic field and the pole of the second magnetic field being of like polarity and creating a region of a single magnetic polarity that is substantially coincident with an annular portion of the coil.

2. The treatment device of claim 1 wherein the two magnetic field sources are first and second magnets arranged adjacent the inner and outer peripheries of the coil, respectively, such that like poles of the magnets face each other.

3. The treatment device of claim 2 wherein the first and second magnets each comprise at least one annular magnet.

4. The treatment device of claim 2 wherein the first and second magnets each comprise at least one bar magnet.

5. The treatment device of claim 4 wherein the magnetic field sources each comprise a plurality of bar magnets having opposed planar surfaces representing magnetic poles.

6. The treatment device of claim 5 wherein the magnets of the first source are arranged such that a single pole of each magnet faces the outer periphery of the coil, the poles facing the coil being of like polarity.

7. The treatment device of claim 6 wherein the magnets of the second source are arranged such that a single pole of each magnet faces the inner periphery of the coil, the poles facing the coil being of like polarity.

8. The treatment device of claim 1 wherein the magnetic fields interact to effectively create an annular region of single magnetic polarity within which the coil resides.

9. The treatment device of claim 8 wherein the magnetic field within the annular region is of substantially constant strength.

10. The treatment device of claim 1 wherein the one pole of the first magnetic field source faces substantially the entire outer periphery of the annular portion of the coil and the one pole of the second magnetic field source faces substantially the entire inner periphery of the annular portion of the coil.

11. A magnetic fluid treatment device comprising:
  a. first and second sources of magnetic fields; and
  b. a coil of tubing arranged such that the first source is outside of an outer periphery of the coil, the second source is within an inner periphery of the coil, and like polar regions of the magnetic fields confront one another and permeate substantially all of an annular portion of the coil, the inner and outer peripheries of the coil being substantially coaxial with a longitudinal axis of the coil, the inner periphery being closer to the longitudinal axis than the outer periphery.

12. The treatment device of claim 11 wherein the first source comprises a first magnet with a pole facing the outer periphery of the coil and the second source comprises a second magnet with a pole facing the inner periphery of the coil, the poles facing the inner and outer peripheries of the coil being of like polarity.

13. The treatment device of claim 12 wherein the first source comprises a plurality of the first magnets and the second source comprises a plurality of the second magnets.

14. The treatment device of claim 13 wherein the magnets are bar magnets.

15. The treatment device of claim 11 wherein the like polar regions form an annular magnetic field region substantially coaxial with the coil that is of essentially one magnetic polarity and of substantially constant strength throughout the tubing of the annular portion of the coil.

16. The treatment device of claim 11 wherein interaction of the fields from the first and second sources establishes a magnetic field having an annular region of one magnetic polarity substantially coincident with the annular portion of the coil and between two annular regions of an opposite magnetic polarity, one of the two annular regions of an opposite magnetic polarity being inside the inner periphery of the coil and the other of the two regions of magnetic polarity being outside of the outer periphery of the coil.

17. The treatment device of claim 11 wherein the first and second sources are adjacent substantially the entire outer and inner peripheries of the annular portion of the tubing, respectively.

18. The treatment device of claim 17 wherein the first and second sources each comprise magnets with surface poles arranged to be parallel to the longitudinal axis of the coil.

19. A method of magnetically treating a fluid comprising the steps of:
  a1. generating a first annular magnetic field with a first magnet having one pole oriented towards a center of the first annular magnetic field; and
  a2. generating a second annular magnetic field substantially coaxially with the first annular magnetic field with a second magnet having a pole facing the one pole of the first magnet, the facing poles of the first and second magnets being of like magnetic polarity and thereby creating an annular region of one magnetic polarity, and wherein two annular regions having a polarity opposite to that of the annular region of one magnetic polarity are created by non-facing poles of the first and second magnets, respectively; and
  b. circulating a fluid through the annular region of one magnetic polarity.

20. The method of claim 19 wherein the step of circulating comprises the sub-step of:
  b1. directing the fluid in a spiral path.

21. The method of claim 20 wherein the step of directing comprises the sub-step of:
  b1.1. directing the fluid through a coil of tubing positioned within the annular region of one polarity.

* * * * *